US010870053B2

(12) United States Patent
He et al.

(10) Patent No.: US 10,870,053 B2
(45) Date of Patent: Dec. 22, 2020

(54) PERSPECTIVE MODE SWITCHING METHOD AND TERMINAL

(71) Applicant: Tencent Technology (Shenzhen) Company Limited, Shenzhen (CN)

(72) Inventors: Ning He, Shenzhen (CN); Xinlong Huang, Shenzhen (CN); Mo Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 52 days.

(21) Appl. No.: 16/293,373

(22) Filed: Mar. 5, 2019

(65) Prior Publication Data
US 2019/0192968 A1 Jun. 27, 2019

Related U.S. Application Data

(63) Continuation of application No. PCT/CN2017/107741, filed on Oct. 26, 2017.

(30) Foreign Application Priority Data

Oct. 26, 2016 (CN) .......................... 2016 1 0947605

(51) Int. Cl.
*A63F 13/5258* (2014.01)
*A63F 13/426* (2014.01)
*G06F 3/14* (2006.01)
(52) U.S. Cl.
CPC ........ *A63F 13/5258* (2014.09); *A63F 13/426* (2014.09); *G06F 3/14* (2013.01);
(Continued)
(58) Field of Classification Search
CPC ............... A63F 13/5258; A63F 13/426; A63F 2300/65; A63F 2300/6684; G06F 3/14;
(Continued)

(56) References Cited

U.S. PATENT DOCUMENTS 5,835,077 A * 11/1998 Dao .................... G01C 9/00
345/157
7,559,834 B1 * 7/2009 York ..................... A63F 13/10
463/2
(Continued)

FOREIGN PATENT DOCUMENTS

CN      1317352      10/2001
CN      101961555     2/2011
(Continued)

OTHER PUBLICATIONS

Machine translation of CN105872666A.*
(Continued)

*Primary Examiner* — David L Lewis
*Assistant Examiner* — Matthew D Hoel
(74) *Attorney, Agent, or Firm* — Oblon, McClelland, Maier & Neustadt, L.L.P.

(57) ABSTRACT

A method and a terminal device for switching perspective are provided. The terminal device receives a perspective switching instruction when the terminal device is in a first perspective mode in which the terminal device displays a scenario from a first perspective. The terminal device determines a second perspective mode to display the scenario from a second perspective. Next, the terminal devices adjusts a first display parameter of a first model of the scenario from the first perspective and a second display parameter of a second model of the scenario from the second perspective according to a preset rule for a transition from the first perspective mode to the second perspective mode. Further, the terminal device displays the first model according to the first display parameter and the second model according to the second display parameter during the transition from the first perspective mode to the second perspective mode.

16 Claims, 7 Drawing Sheets

(52) U.S. Cl.
CPC ... *A63F 2300/65* (2013.01); *A63F 2300/6684* (2013.01); *G09G 2320/062* (2013.01); *G09G 2354/00* (2013.01); *G09G 2370/02* (2013.01)

(58) Field of Classification Search
CPC ........... G09G 2354/00; G09G 2370/02; G09G 2320/062
See application file for complete search history.

(56) References Cited

U.S. PATENT DOCUMENTS

| | | | |
|---|---|---|---|
| 7,594,847 B1* | 9/2009 | York | A63F 13/00 463/5 |
| 8,012,016 B2* | 9/2011 | York | A63F 13/48 463/31 |
| 8,012,017 B2* | 9/2011 | York | A63F 13/42 463/31 |
| 8,894,484 B2* | 11/2014 | Latta | A63F 13/212 463/29 |
| 8,944,928 B2* | 2/2015 | Kaps | G06F 13/40 473/199 |
| 9,039,527 B2* | 5/2015 | Bentley | G06T 19/006 463/31 |
| 9,168,454 B2* | 10/2015 | Manning | G07F 17/3225 |
| 9,536,374 B2* | 1/2017 | Manning | G07F 17/3225 |
| 9,703,369 B1* | 7/2017 | Mullen | G06F 3/0481 |
| 9,744,448 B2* | 8/2017 | Mullen | A63F 13/26 |
| 9,746,921 B2* | 8/2017 | Mallinson | A63F 13/5255 |
| 9,746,984 B2* | 8/2017 | Stafford | G02B 27/017 |
| 9,901,816 B2* | 2/2018 | Lee | A63F 13/214 |
| 9,987,554 B2* | 6/2018 | Stafford | A63F 13/5255 |
| 10,115,238 B2* | 10/2018 | Chen | G06T 19/006 |
| 10,518,172 B2* | 12/2019 | Chen | G06F 3/012 |
| 10,521,951 B2* | 12/2019 | Vaganov | H04N 13/30 |
| 10,525,350 B2* | 1/2020 | Shiraiwa | A63F 13/26 |
| 10,653,947 B2* | 5/2020 | Matsuzaki | A63F 13/211 |
| 2004/0219980 A1 | 11/2004 | Bassett et al. | |
| 2007/0220108 A1* | 9/2007 | Whitaker | G06F 3/017 709/217 |
| 2008/0143722 A1* | 6/2008 | Pagan | A63F 13/5255 345/427 |
| 2010/0182340 A1* | 7/2010 | Bachelder | G09G 3/003 345/633 |
| 2011/0018868 A1* | 1/2011 | Inoue | A63F 13/5255 345/419 |
| 2011/0035684 A1* | 2/2011 | Lewis | A63F 13/335 715/753 |
| 2013/0065682 A1 | 3/2013 | Izuno et al. | |
| 2013/0316820 A1* | 11/2013 | Douglas | A63F 13/212 463/31 |
| 2014/0361956 A1* | 12/2014 | Mikhailov | G09G 3/3413 345/8 |
| 2015/0182858 A1* | 7/2015 | Angelici | A63F 13/28 463/35 |
| 2015/0260474 A1* | 9/2015 | Rublowsky | A63F 13/213 434/16 |
| 2015/0279079 A1* | 10/2015 | Wieczorek | A63F 13/00 345/473 |
| 2016/0271487 A1* | 9/2016 | Crouse | A63F 1/00 |
| 2019/0240569 A1* | 8/2019 | Kuwatani | G06F 3/012 |
| 2019/0240570 A1* | 8/2019 | Kuwatani | A63F 13/92 |
| 2019/0240582 A1* | 8/2019 | Kuwatani | A63F 13/69 |
| 2019/0243445 A1* | 8/2019 | Kuwatani | G06F 3/017 |
| 2020/0254337 A1* | 8/2020 | Kuwatani | G06F 3/04817 |

FOREIGN PATENT DOCUMENTS

| | | |
|---|---|---|
| CN | 102347043 | 2/2012 |
| CN | 103325135 | 9/2013 |
| CN | 104780419 | 7/2015 |
| CN | 105069846 | 11/2015 |
| CN | 105373379 | 3/2016 |
| CN | 105630510 | 6/2016 |
| CN | 105872666 | 8/2016 |
| CN | 106528020 | 3/2017 |
| TW | 200836091 | 9/2008 |

OTHER PUBLICATIONS

Machine translation of CN106528020A.*
Machine translation of CN102347043A.*
Machine translation of CN103325135A.*
Machine translation of CN104780419A.*
Machine translation of CN105069846A.*
Machine translation of CN105373379A.*
Machine translation of CN105630510A.*
International Search Report dated Feb. 2, 2018, issued in International Application No. PCT/CN2017/107741 with English translation.
Office Action dated Feb. 3, 2019, in Chinese Patent Application No. 201610947605.0 with concise English translation.
Office Action dated Oct. 18, 2018, in Chinese Patent Application No. 201610947605.0 with concise English translation.
Written Opinion dated Feb. 2, 2018 in International Application No. PCT/CN2017/107741.

* cited by examiner

FIG. 1-a
FIG. 1-b

FIG. 1-c
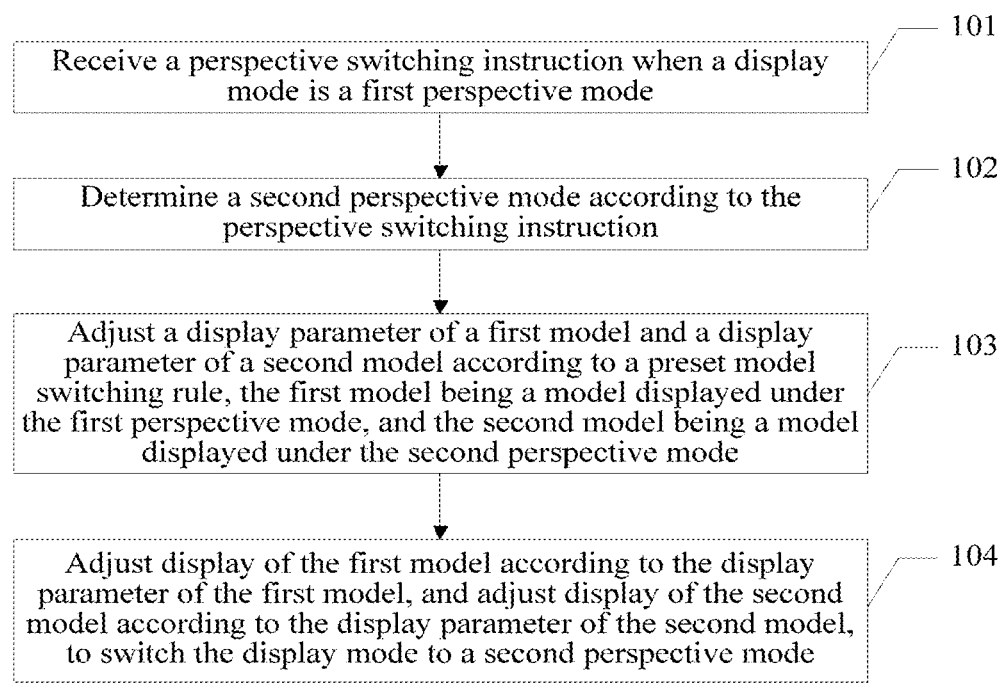
FIG. 2

PERSPECTIVE MODE SWITCHING METHOD AND TERMINAL

RELATED APPLICATION

This application is a continuation of International Application No. PCT/CN2017/107741, filed on Oct. 26, 2017, which claims priority to Chinese Patent Application No. 201610947605.0, entitled "PERSPECTIVE MODE SWITCHING METHOD AND TERMINAL" filed on Oct. 26, 2016. The entire disclosures of the prior applications are hereby incorporated by reference in their entirety.

FIELD OF THE TECHNOLOGY

This application relates to the field of computers.

BACKGROUND OF THE DISCLOSURE

A first-person perspective is a perspective that in a game, a user cannot see a role that he plays but can see a scenario in which the role is, and plays the game from a subjective perspective of the role. A third-person perspective is a perspective that in a game, a role is manipulated to play the game from a third-party perspective. Currently, a user proposes higher requirements on gaming experience, for example, switching of person perspectives. Therefore, switching of person perspectives in a game has been a trend.

In current solutions, the first-person perspective corresponds to a lens (or virtual lens), and the third-person perspective corresponds to another lens. Switching of person perspectives is implemented by switching of lenses.

However, in a process of switching lenses, role models under different person perspectives may seriously overlap. For example, in a process of switching the first-person perspective to the third-person perspective, first, a first role model displayed under the first-person perspective needs to be switched to a second role model displayed under the third-person perspective. In a process of switching the first role model to the second role model, because of existence of a switching delay, the first role model and the second role model exist at the same time within the delay. Consequently, the first role model and the second role model overlap, and thus, switching is not smooth and natural.

SUMMARY

Embodiments of this application provide a perspective mode switching method and a terminal, to smoothly and naturally complete switching of perspective modes.

According to aspects of the disclosure, a method and a terminal device for switching perspective are provided. For example, the terminal device includes interface circuitry and processing circuitry. A perspective switching instruction is received via the interface circuitry of the terminal device. The perspective switching instruction is received when the terminal device is in a first perspective mode. In the first perspective mode, the terminal device displays a scenario from a first perspective. Subsequently, a second perspective mode is determined by the processing circuitry of the terminal device in response to the perspective switching instruction. In the second perspective mode, the terminal device displays the scenario from a second perspective. Next, the processing circuitry adjusts a first display parameter of a first model of the scenario from the first perspective and a second display parameter of a second model of the scenario from the second perspective according to a preset rule for a transition from the first perspective mode to the second perspective mode. Further, the terminal device displays the first model according to the first display parameter and the second model according to the second display parameter on a screen of the terminal device during the transition from the first perspective mode to the second perspective mode.

In an embodiment, the display parameter includes transparency. In the disclosed method, during the transition from the first perspective mode to the second perspective mode, a first transparency of the first model of the scenario from the first perspective is adjusted according to the preset rule. A second transparency of the second model of the scenario from the second perspective is also adjusted according to the preset rule.

In an embodiment, during the transition from the first perspective mode to the second perspective mode, the first transparency is adjusted to linearly change with time. The second transparency is adjusted to be inversely correlated with the first transparency.

In an embodiment, during the transition from the first perspective mode to the second perspective mode, the first transparency is increased to a target level before reducing the second transparency. When the first transparency is increased to the target level, the first transparency is increased and the second transparency is reduced simultaneously.

In an embodiment, the first and second display parameters are brightness. During the transition from the first perspective mode to the second perspective mode, a first brightness of the first model of the scenario from the first perspective is adjusted according to the preset rule. In addition, a second brightness of the second model of the scenario from the second perspective is adjusted according to the switching rule.

In an embodiment, during the transition from the first perspective mode to the second perspective mode, the first brightness is adjusted to linearly change with time, and the second brightness is adjusted to be inversely correlated with the first brightness.

In an embodiment, during the transition from the first perspective mode to the second perspective mode, the first brightness is reduced to a target level before increasing the second brightness. When the first brightness is reduced to the target value, the first brightness is reduced and the second brightness is increased simultaneously.

In an embodiment, the display parameter is a position of a virtual lens. During the transition from the first perspective mode to the second perspective mode, a position of a virtual lens is adjusted according to a preset lens moving rule. The position adjustment of the virtual lens is stopped when a collision of the virtual lens to an object in the scenario is detected.

In an example, the position of the virtual lens is adjusted from a first position to a second position. The first position corresponds to the first model of the scenario from the first perspective and the second position corresponds to the second model of the scenario from the second perspective.

In yet another embodiment, a plurality of pictures corresponding to a motion from the first perspective to the second perspective is generated. The plurality of pictures is displayed during the transition from the first perspective mode to the second perspective mode.

According to another aspect, a non-transitory computer readable storage medium is provided. The medium stores instructions which when executed by at least one processors cause the at least one processor to perform the method for switching perspective which is mentioned above.

It can be seen from the aforementioned technical solutions that the embodiments of this application have the following advantages: in the embodiments of this application, the display parameters are reasonably adjusted, and the display of the first model and the second model is adjusted according to the adjusted display parameters, to switch the first perspective mode to the second perspective mode. As a result, a problem of overlapping between the first model and the second model in a perspective mode switching process, leading to that switching is not smooth and natural is resolved, to achieve an objective of smoothly and naturally completing switching of perspective modes.

BRIEF DESCRIPTION OF THE DRAWINGS

To describe the technical solutions in the embodiments of this application more clearly, the following briefly describes the accompanying drawings required for describing the embodiments. The accompanying drawings in the following description show merely some embodiments of this application, and a person of ordinary skill in the art may still derive other drawings from these accompanying drawings.

FIG. 1-*a* is a schematic diagram of an interface under a first-person perspective of an A application according to an embodiment of this application;

FIG. 1-*b* is a schematic diagram of an interface in a process of switching a first-person perspective to a third-person perspective of an A application according to an embodiment of this application;

FIG. 1-*c* is a schematic diagram of an interface under a third-person perspective of an A application according to an embodiment of this application;

FIG. 2 is a schematic diagram of an embodiment of a perspective mode switching method according to an embodiment of this application;

DESCRIPTION OF EMBODIMENTS

Figure 3:
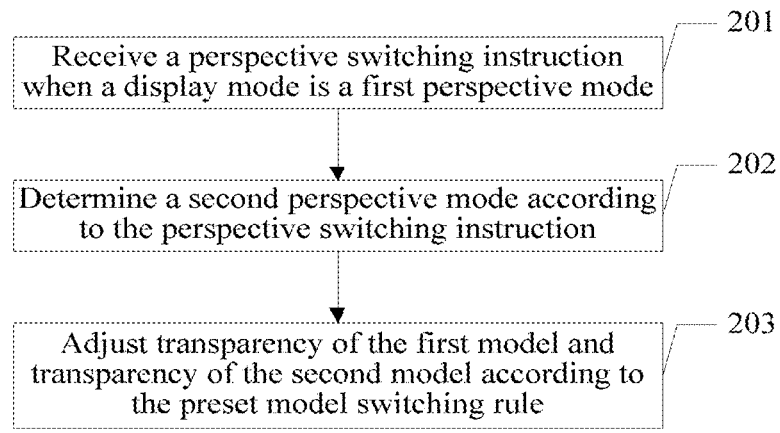
FIG. 3 is a schematic diagram of another embodiment of a perspective mode switching method according to an embodiment of this application.

The embodiments of this application provide a perspective mode switching method and a terminal, to smoothly and naturally complete switching of perspective modes.

In the specification, claims, and accompanying drawings of this application, the terms "first", "second", "third", "fourth" and so on (if present) are intended to distinguish between similar objects rather than indicating a specific order. It should be understood that data used in this way can be interchanged in an appropriate case, so that the embodiments of this application that are described herein can, for example, be implemented in a sequence other than those sequences illustrated or described herein. Moreover, the terms "include", "contain" and any other variants mean to cover the non-exclusive inclusion. For example, a process, method, system, product, or device that includes a series of steps or units is not necessarily limited to those steps or units that are expressly listed, but may include other steps or units not expressly listed or inherent to such a process, method, product, or device.

The perspective mode switching method provided in an embodiment of this application may be applied to a client. The client may be loaded in a terminal. The terminal may be a smartphone, a tablet computer, an e-book reader, MP3 (Moving Picture Experts Group Audio Layer III) player, a MP4 (Moving Picture Experts Group Audio Layer IV) player, a laptop portable computer, a desktop computer, and the like.

First, an application scenario of this embodiment of this application is described.

It should be understood that the client to which this embodiment is applied may be an interactive application, and the interactive application may be a game application, such as a large PC game. In an actual application, the game application may be a shooting game, and may be applied to an A application in an entertainment hall. It may be understood that this embodiment of this application is not limited to be applied to the application. However, for ease of description, descriptions are provided by using an example in which this embodiment is applied to the A application.

The application is a shooting game. Under a first-person perspective, a user presses a key to switch to a third-person perspective. Under the third-person perspective, the user presses the same key or another key to switch the first-person perspective.

Referring to FIG. 1-*a* to FIG. 1-*c*, FIG. 1-*a* to FIG. 1-*c* are used for showing a flow of switching the first-person perspective to the third-person perspective of the A application. FIG. 1-*a* is a schematic diagram of an interface under a first-person perspective of an A application according to an embodiment of this application. In FIG. 1-*a*, the user is shooting from the first-person perspective. In this case, a display model in the interface is a model of holding a gun with two hands, and the model of holding a gun with two hands is a two-hand model. For ease of description, descriptions are provided below by using the two-hand model. It should be understood that the two-hand model is very common in a first-person shooting game. The two-hand model is a model mainly consisting of two hands and a gun, and the two-hand model can bring good gaming experience to a user. FIG. 1-*b* is a schematic diagram of an interface in a process of switching a first-person perspective to a third-person perspective of an A application according to an embodiment of this application. In FIG. 1-*b*, in a process that the two-hand model disappears, a role model starts to gradually appear. FIG. 1-*c* is a schematic diagram of an interface under a third-person perspective of an A application according to an embodiment of this application. In FIG. 1-*c*, the two-hand model completely disappears, the role model completely appears, and a role is in a melee attack state.

Similarly, the flow of switching the third-person perspective to the first-person perspective of the A application is a reverse flow of the flow from FIG. 1-*a* to FIG. 1-*c* and is not described herein.

To under this embodiment of this application, a perspective mode switching method in this embodiment of this application is described below by using an exemplary embodiment:

Referring to FIG. 2, an embodiment of the perspective mode switching method in this embodiment of this application includes:

Step 101: Receive a perspective switching instruction when a display mode is a first perspective mode.

In this embodiment, the display mode includes a first perspective mode and a second perspective mode. When the display mode is the first perspective mode, the perspective switching instruction is used for switching the first perspective mode to the second perspective mode.

It should be understood that when the first perspective mode is a first-person perspective, the second perspective mode is a third-person perspective. When the first perspective mode is the third-person perspective, the second perspective mode is the third-person perspective.

The user may trigger the perspective switching instruction by pressing a key, such as a number key 1 and a number key 2, on a keyboard. It should be understood that the perspective switching instruction may be bound with and establish a correspondence with a specific key in advance.

After the user triggers the perspective switching instruction, the terminal may receive the perspective switching instruction.

Step 102: Determine a second perspective mode according to the perspective switching instruction.

In this embodiment, after the perspective switching instruction is received, the second perspective mode is determined according to the perspective switching instruction. For example, the first perspective mode is the first-person perspective, and the first-person perspective is switched to the third-person perspective according to the perspective switching instruction, and therefore, it can be determined that the second perspective mode is the third-person perspective.

Step 103: Adjust a display parameter of a first model and a display parameter of a second model according to a preset model switching rule (or a preset rule), the first model being a model displayed under the first perspective mode, and the second model being a model displayed under the second perspective mode.

In this embodiment, the terminal may adjust the display parameter of the first model and the display parameter of the second model according to the preset model switching rule. The display parameter of the first model may be used for controlling display of the first model, and the display parameter of the second model may be used for controlling display of the second model.

Step 104: Adjust display of the first model according to the display parameter of the first model, and adjust display of the second model according to the display parameter of the second model, to switch the display mode to a second perspective mode.

Along with adjustment of the display parameter of the first model, the display of the first model is correspondingly adjusted. Along with adjustment of the display parameter of the second model, the display of the second model is correspondingly adjusted. In this embodiment, in a process in which the terminal adjusts the display parameter of the first model according to the preset model switching rule, the terminal may make, by adjusting the display parameter of the first model, the first model gradually hidden with time. In a process in which the first model gradually becomes hidden with time, the terminal makes, by adjusting the display parameter of the second model, the second model gradually appear with time. For example, the terminal may start to adjust the display parameter of the second model when half of a gradually hiding process of the first model is conducted, so that the second model starts to gradually appear. Certainly, alternatively, the terminal may start to adjust the display parameter of the second model when one third of a gradually hiding process of the first model is conducted, so that the second model starts to gradually appear. This is not limited herein.

In this embodiment, the terminal may gradually completely hide the first model by adjusting the display parameter of the first model and gradually make the second model completely appear by adjusting the display parameter of the second model. After the first model is completely hidden, and the second model is made to completely appear, a task of switching the display mode to the second perspective mode is accomplished.

In this embodiment, the display parameters are reasonably adjusted, and the display of the first model and the second model is adjusted according to the adjusted display parameters, to switch the first perspective mode to the second perspective mode. As a result, a problem of overlapping between the first model and the second model in a perspective mode switching process, leading to that switching is not smooth and natural is resolved, to achieve an objective of smoothly and naturally completing switching of perspective modes.

In an actual application, the display parameter of the first model and the display parameter of the second model may be adjusted according to the preset model switching rule in a plurality of manners. Descriptions are separately provided below:

I. The display parameter includes transparency.

Descriptions are provided below by using specific embodiments. Referring to FIG. 3, another embodiment of the perspective mode switching method in this embodiment of this application includes:

Step 201: Receive a perspective switching instruction when a display mode is a first perspective mode.

Step 202: Determine a second perspective mode according to the perspective switching instruction.

In this embodiment, for step 201 and step 202, refer to the foregoing step 101 and step 102. Details are not provided herein.

Step 203: Adjust transparency of the first model and transparency of the second model according to the preset model switching rule.

In some possible implementations of this application, the transparency of the first model is adjusted according to a transparency parameter of the first model, and the transparency of the second model is adjusted according to a transparency parameter of the second model, the transparency parameter of the first model linearly changing with time, the transparency parameter of the second model linearly changing with time, and the transparency parameter of the first model being inversely correlated to the transparency parameter of the second model.

In this embodiment, the terminal may define the transparency parameter. The transparency parameter is referred to as a α value for short and has a value range of [0, 1]. A greater α value indicates higher transparency of the model, that is, that the model is more transparent. When the α value is 1, the model is completely transparent. Otherwise, when the α value is 0, the model is completely non-transparent, so that the terminal may adjust the transparency of the model by adjusting the transparency parameter of the model, so as to achieve an objective that the model gradually becomes hidden or gradually appears.

Figure 4:
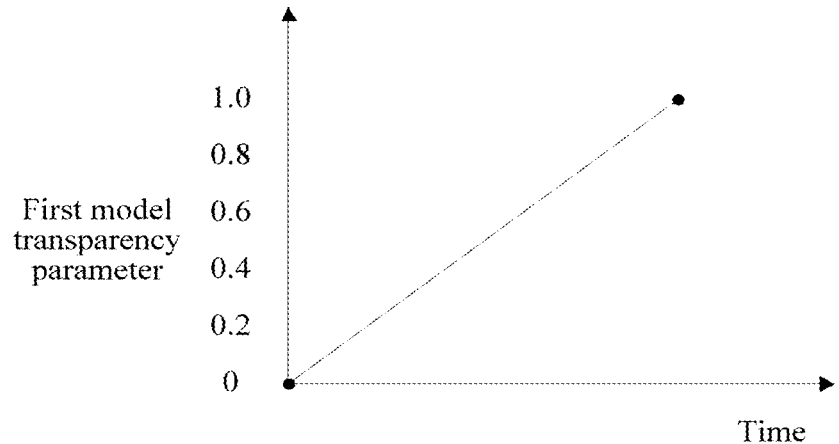
FIG. 4 is an exemplary schematic diagram illustrating that a transparency parameter of a first model is positively correlated to time according to an embodiment of this application.
Figure 5:
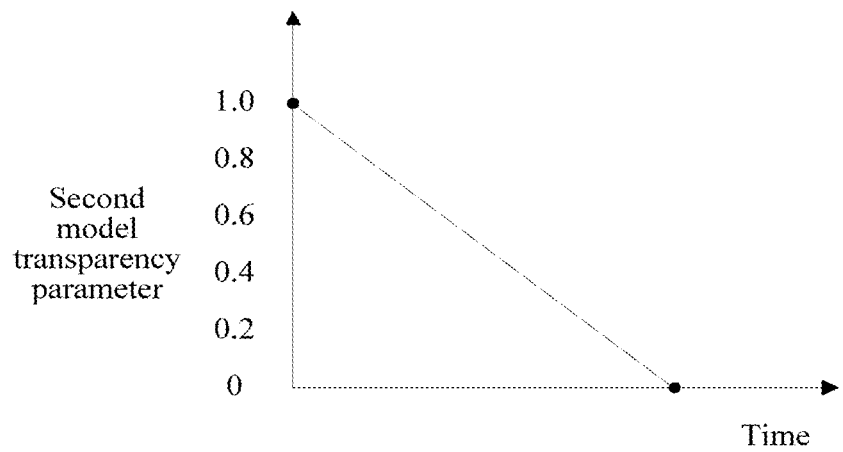
FIG. 5 is an exemplary schematic diagram illustrating that a transparency parameter of a second model is reversely correlated to time according to an embodiment of this application.

The transparency parameter of the first model and the transparency parameter of the second model both linearly change with time, and the transparency parameter of the first model is inversely correlated to the transparency parameter of the second model. For example, the transparency parameter of the first model is positively correlated to time, and the transparency parameter of the second model is inversely correlated to time. The transparency parameter of the first model is inversely correlated to time, and the transparency parameter of the second model is positively correlated to time. For a specific schematic diagram illustrating that a transparency parameter of a first model is positively correlated to time, refer to FIG. 4. In FIG. 4, the transparency parameter of the first model is positively correlated to time. For a specific schematic diagram illustrating that a transparency parameter of a second model is reversely correlated to time, refer to FIG. 5. In FIG. 5, the transparency parameter of the second model is reversely correlated to time.

In this embodiment, when value ranges of the transparency parameter of the first model and the transparency parameter of the second model are both [0, 1], if a transparency degree of the transparency of the first model is higher than a transparency degree of the transparency of the second model, it indicates that after the transparency parameter of the first model and the transparency parameter of the second model are adjusted, the adjusted transparency parameter of the first model is greater than the adjusted transparency parameter of the second model.

In some possible implementations of this application, the transparency of the first model may be adjusted according to the transparency parameter of the first model; and the transparency of the first model continues to be adjusted according to the transparency parameter of the first model, and the transparency of the second model continues to be adjusted according to the transparency parameter of the second model when the transparency of the first model reaches a first preset threshold.

In an actual application, when the terminal adjusts the transparency of the first model from 0 to 50% by adjusting the transparency parameter of the first model, the terminal may start to adjust the transparency of the second model from 100% to 0 by adjusting the transparency parameter of the second model and continues to adjust the transparency of the first model from 50% to 100%. After adjustment, the first model is completely hidden, and the second model completely appears. In addition, a moment at which the transparency of the first model is adjusted to 100% is the same as a moment at which the transparency of the second model is adjusted to 0.

In this embodiment, the terminal may gradually completely hide the first model by adjusting the transparency of the first model and gradually make the second model completely appear by adjusting the transparency of the second model. After the first model is completely hidden, and the second model is made to completely appear, a task of switching the display mode to the second perspective mode is accomplished.

In this embodiment, the display of the first model and the second model is adjusted by reasonably adjusting the transparency, to resolve a problem of overlapping between the first model and the second model in a switching process, so as to resolve a problem that switching is not smooth and natural and achieve an objective of smoothly and naturally completing switching of perspective modes.

II. The display parameter includes brightness.

Figure 6:
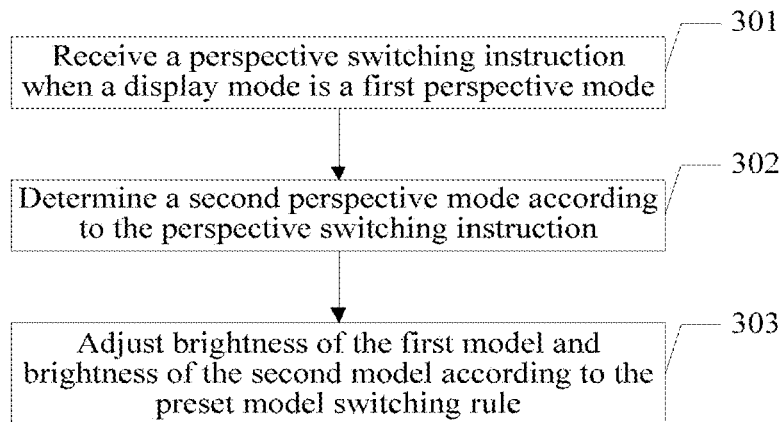
FIG. 6 is a schematic diagram of another embodiment of a perspective mode switching method according to an embodiment of this application.

Descriptions are provided below by using specific embodiments. Referring to FIG. 6, another embodiment of the perspective mode switching method in this embodiment of this application includes:

Step 301: Receive a perspective switching instruction when a display mode is a first perspective mode.

Step 302: Determine a second perspective mode according to the perspective switching instruction.

In this embodiment, for step 301 and step 302, refer to the foregoing step 101 and step 102. Details are not provided herein.

Step 303: Adjust brightness of the first model and brightness of the second model according to the preset model switching rule.

In some possible implementations of this application, the brightness of the first model is adjusted according to a brightness parameter of the first model, and the brightness of the second model is adjusted according to a brightness parameter of the second model, the brightness parameter of the first model linearly changing with time, the brightness parameter of the second model linearly changing with time, and the brightness parameter of the first model being inversely correlated to the brightness parameter of the second model.

In this embodiment, the terminal may define the brightness parameter. The brightness parameter is referred to as a β value for short and has a value range of [0, 1]. A greater β value indicates higher brightness of the model. When the β value is 1, the model has the highest brightness degree. Otherwise, when the β value is 0, the model has the lowest brightness degree, so that the terminal may adjust the brightness of the model by adjusting the brightness parameter of the model, to make, by adjusting the brightness of the model, the user see the model or not see the model, so as to achieve an objective that the model gradually becomes hidden or gradually appears.

It should be understood that whether the user sees or cannot see the model is related to the brightness. Within a brightness range, a higher brightness indicates that human eyes see the model more clearly, and a lower brightness indicates that human eyes see the model less clearly until the user cannot see the model, so as to achieve, by adjusting the brightness, an objective that the model gradually becomes hidden or gradually appears.

The brightness parameter of the first model and the brightness parameter of the second model both linearly change with time, and the brightness parameter of the first model is inversely correlated to the brightness parameter of the second model. For example, the brightness parameter of the first model is positively correlated with time, and the brightness parameter of the second model is inversely correlated with time. The brightness parameter of the first model is inversely correlated with time, and the brightness parameter of the second model is positively correlated with time.

In this embodiment, when value ranges of the brightness parameter of the first model and the brightness parameter of the second model are both [0, 1], if a brightness degree of the brightness of the first model is lower than a brightness degree of the brightness of the second model, it indicates that after the brightness parameter of the first model and the brightness parameter of the second model are adjusted, the adjusted brightness of the first model is less than the adjusted brightness of the second model.

In some possible implementations of this application, the brightness of the first model may be adjusted according to the brightness parameter of the first model; and the brightness of the first model continues to be adjusted according to the brightness parameter of the first model, and the brightness of the second model continues to be adjusted according to the brightness parameter of the second model when the brightness of the first model reaches a first preset threshold.

In an actual application, when the terminal adjusts the brightness of the first model from 100% to 50% by adjusting the brightness parameter of the first model, the terminal may start to adjust the brightness of the second model from 0 to 100% by adjusting the brightness parameter of the second model and continues to adjust the brightness of the first model from 50% to 0. After adjustment, the user cannot see the first model, which is equivalent to that the first model is completely hidden, and the user gradually clearly sees the second model, which is equivalent to that the second model completely appears. In addition, a moment at which the brightness of the first model is adjusted to 0 is the same as a moment at which the brightness of the second model is adjusted to 100%.

In this embodiment, the terminal may make, by adjusting the brightness of the first model, the user gradually not see the first model and make, by adjusting the brightness of the second model, the user gradually see the second model, so as to complete the task of switching the display mode to the second perspective mode.

In this embodiment, the display of the first model and the second model is adjusted by reasonably adjusting the brightness, to resolve a problem of overlapping between the first model and the second model in a switching process, so as to resolve a problem that switching is not smooth and natural and achieve an objective of smoothly and naturally completing switching of perspective modes.

In this embodiment of this application, in a process of switching the display mode to the second perspective mode. In this application, switching may be completed with the help of an operation of forward pushing or backward pulling on the camera lens. Therefore, based on the foregoing embodiments, in some embodiments of this application, the method may further include:

moving a lens position according to a preset lens moving rule when the display of the first model and the second model is adjusted.

Further, if a lens corresponding to the first model is at a first position, and a lens corresponding to the second model is at a second position, the moving a lens position according to a preset lens moving rule may include:

moving a lens from the first position corresponding to the first model to the second position corresponding to the second model.

Figure 7:
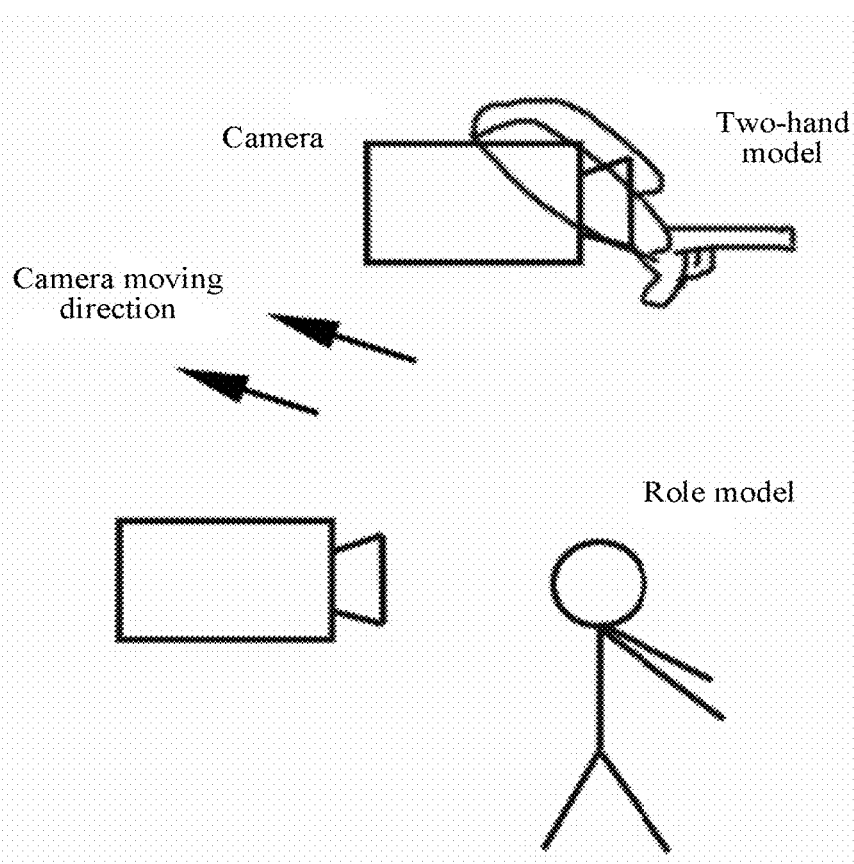
FIG. 7 is a schematic diagram of a movement direction of a camera when a first-person perspective is switched to a third-person perspective according to an embodiment of this application.

In this embodiment, scenario pictures that the user sees are all obtained through shooting by a virtual camera lens (or virtual lens) in an application. A position of the camera lens is bound with the model. In this embodiment of this application, the position of the camera lens may be controlled by adjusting an offset (X0, Y0, Z0) between the position of the camera lens and a position at which the model is. As shown in FIG. 7, FIG. 7 is a schematic diagram of a movement direction of a camera lens when a first-person perspective is switched to a third-person perspective. In FIG. 7, a direction that a role model faces is a positive Y axis, a vertical direction is a positive Z axis, and a direction perpendicular to the Y axis on a horizontal plane is an X axis. In the process of switching the first-person perspective to the third-person perspective, the camera lens is moved backward, and some upward offsets are added, to complete movement of the camera lens. From a mathematical point of view, Y0 gradually decreases, and Z0 gradually increases, so that an operation of backward pulling on the camera lens is completed; Y0 gradually increases, and Z0 gradually decreases, so that an operation of forward pushing on the camera lens is completed.

In this embodiment, a switching process can be made to be more smooth and natural with the help of an operation of forward pushing or backward pulling on the camera lens in a process of switching perspective modes.

In this embodiment of this application, considering that in the process of switching the first-person perspective to the third-person perspective, a situation in which a role model leans back against a wall or the like may cause a camera to be inserted into a bunker, and consequently, picture chaos is caused. to avoid the foregoing problem, based on the foregoing embodiments, in some embodiments of this application, the method may further include:

stopping a moving operation on the lens if it is detected in a process of moving the lens that the lens collides.

In this embodiment, collision detection is added to the camera lens. If the camera lens collides in a moving process, the moving operation on the lens is immediately stopped, to ensure picture quality after switching.

In this embodiment of this application, in the process of switching the display mode to the second perspective mode, in this embodiment of this application, switching may also be completed with the help of a switching operation on a motion picture. Therefore, based on the foregoing embodiments, in some embodiments of this application, the method may further include:

switching a motion picture corresponding to the first model to a motion picture corresponding to the second model according to a preset motion switching rule when the display of the first model and the second model is adjusted.

In this embodiment, visual reasonableness in a switching process is ensured by using the motion picture corresponding to the first model and the motion picture corresponding to the second model. For example, in an actual application, the terminal can ensure visual reasonableness in a switching process by using actions of putting down and taking up of a ranged weapon and a melee weapon.

It can be known with reference to the foregoing embodiments that in this embodiment of this application, the display modes can be smoothly and naturally switched in manners of reasonably adjusting the display parameters (transparency and brightness), performing a moving operation on the camera lens, collision detection of the camera lens, and switching of the motion pictures.

Figure 8:
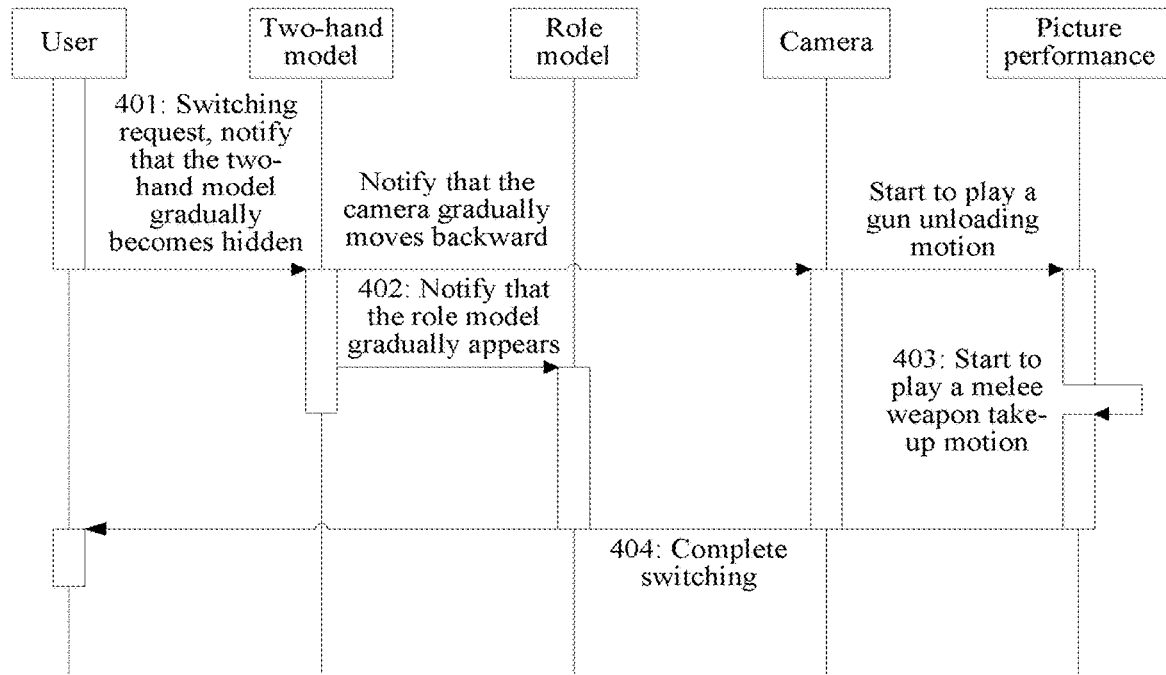
FIG. 8 is a schematic diagram of a time sequence of switching a first-person perspective to a third-person perspective according to an embodiment of this application.

For ease of understanding, the following describes the perspective mode switching method provided in an embodiment of this application by using specific instances and with reference to actual applications. Referring to FIG. 8, FIG. 8 is a schematic diagram of a time sequence of switching a first-person perspective to a third-person perspective according to an embodiment of this application. steps are described below:

Step 401: A user battles with a gun under a first-person perspective, the user initiates a perspective switching request, and while notifying that a two-hand model gradually becomes hidden, a terminal notifies that a camera lens gradually moves backward and starts to play a gun unloading motion picture.

Step 402: The terminal notifies that a role model gradually appears when half of a process that the two-hand model gradually becomes hidden is conducted.

Step 403: Continue to play a melee weapon take-up motion picture when playing of the gun unloading motion picture is completed.

Step 404: At the same moment, the role model appears, the camera lens backward moves to a position of a third-person perspective, playing of the melee weapon take-up motion picture is completed, and switching from the first-person perspective to the third-person perspective is completed.

Figure 9:
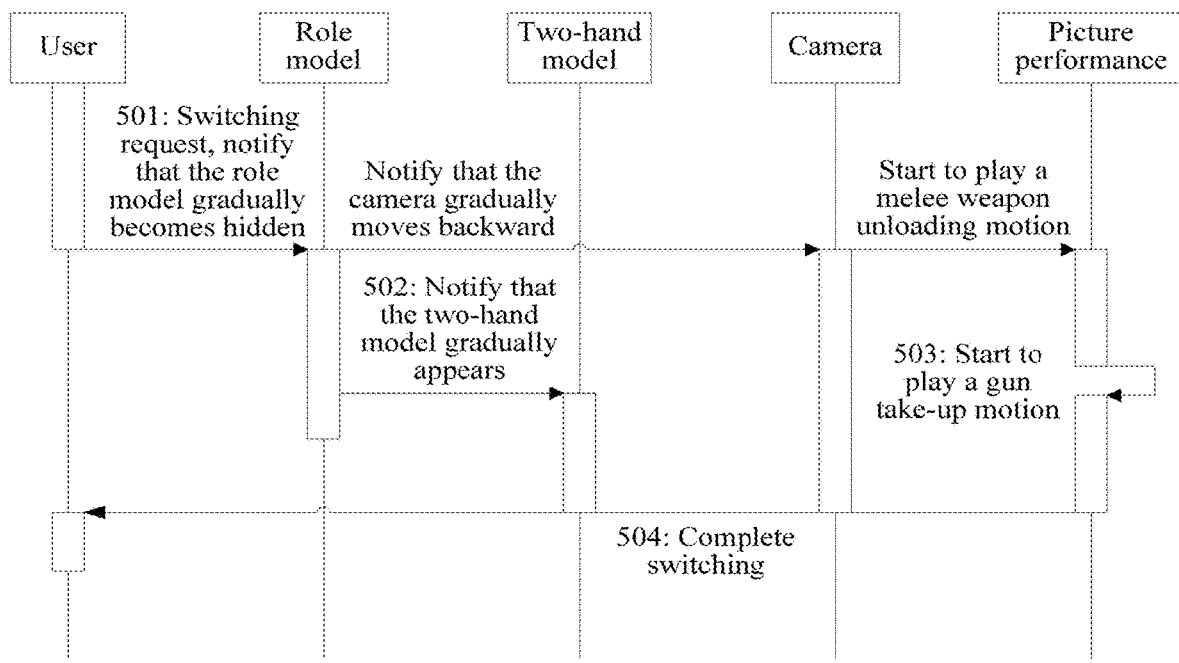
FIG. 9 is a schematic diagram of a time sequence of switching a third-person perspective to a first-person perspective according to an embodiment of this application.

Similarly, referring to FIG. 9, FIG. 9 is a schematic diagram of a time sequence of switching a third-person perspective to a first-person perspective according to an embodiment of this application. steps are described below:

Step 501: A user battles with a gun under a third-person perspective, the user initiates a perspective switching request, and while notifying that a role model gradually becomes hidden, a terminal notifies that a camera lens is gradually pushed forward and starts to play a melee weapon unloading motion picture.

Step 502: The terminal notifies that a two-hand model gradually appears when half of a process that the role model gradually becomes hidden is conducted.

Step 503: Continue to play a gun take-up motion picture when playing of the melee weapon unloading motion picture is completed.

Step 504: At the same moment, the two-hand model appears, the camera lens is pushed forward to a position of a first-person perspective, playing of the gun take-up motion picture is completed, and switching from the third-person perspective to the first-person perspective is completed.

Figure 10:
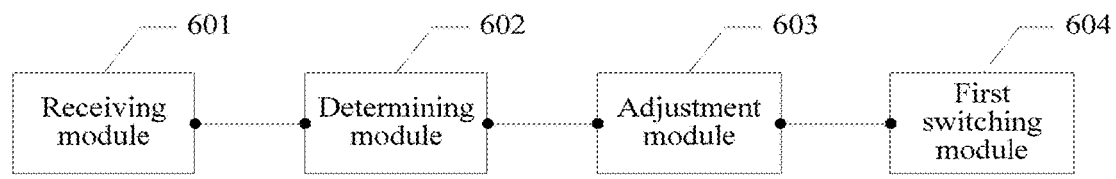
FIG. 10 is a schematic diagram of an embodiment of a terminal according to an embodiment of this application.

The perspective mode switching method in this embodiment of this application is described above by using the specific embodiment, and a terminal in this embodiment of this application is described below by using an embodiment. Referring to FIG. 10, the terminal in this embodiment of this application may include:

a receiving module 601, configured to receive a perspective switching instruction when a display mode is a first perspective model;

a determining module 602, configured to determine a second perspective mode according to the perspective switching instruction received by the receiving module 601;

an adjustment module 603, configured to adjust a display parameter of a first model and a display parameter of a second model according to a preset model switching rule, the first model being a model displayed under the first perspective mode, and the second model being a model displayed under the second perspective mode; and a first switching module 604, configured to: adjust display of the first model according to the display parameter of the first model, and adjust display of the second model according to the display parameter of the second model, to switch the display mode to a second perspective mode.

In this embodiment, this embodiment of this application has the following advantages: in this embodiment of this application, the display parameters are reasonably adjusted, and the display of the first model and the second model is adjusted according to the adjusted display parameters, to switch the first perspective mode to the second perspective mode. As a result, a problem of overlapping between the first model and the second model in a perspective mode switching process, leading to that switching is not smooth and natural is resolved, to achieve an objective of smoothly and naturally completing switching of perspective modes.

In an optional embodiment of the embodiments of this application, if the display parameter includes transparency, the adjustment module 603 may be configured to adjust transparency of the first model and transparency of the second model according to the preset model switching rule.

Further, that the adjustment module 603 is configured to adjust transparency of the first model and transparency of the second model according to the preset model switching rule may include:

adjust the transparency of the first model according to a transparency parameter of the first model, and adjust the transparency of the second model according to a transparency parameter of the second model, the transparency parameter of the first model linearly changing with time, the transparency parameter of the second model linearly changing with time, and the transparency parameter of the first model being inversely correlated to the transparency parameter of the second model.

Further, that the adjustment module 603 is configured to adjust the transparency of the first model according to a transparency parameter of the first model, and adjust the transparency of the second model according to a transparency parameter of the second model may include:

adjust the transparency of the first model according to the transparency parameter of the first model; and continue to adjust the transparency of the first model according to the transparency parameter of the first model and adjust the transparency of the second model according to the transparency parameter of the second model when the transparency of the first model reaches a first preset threshold.

In this embodiment, the display of the first model and the second model is adjusted by reasonably adjusting the transparency, to resolve a problem of overlapping between the first model and the second model in a switching process, so as to resolve a problem that switching is not smooth and natural and achieve an objective of smoothly and naturally completing switching of perspective modes.

Optionally, in an optional embodiment of the embodiments of this application, if the display parameter includes brightness, the adjustment module 603 is configured to adjust brightness of the first model and brightness of the second model according to the preset model switching rule.

Further, that the adjustment module 603 is configured to adjust brightness of the first model and brightness of the second model according to the preset model switching rule may include:

adjust the brightness of the first model according to a brightness parameter of the first model, and adjust the brightness of the second model according to a brightness parameter of the second model, the brightness parameter of the first model linearly changing with time, the brightness parameter of the second model linearly changing with time, and the brightness parameter of the first model being inversely correlated to the brightness parameter of the second model.

Further, the adjustment module 603 is configured to adjust the brightness of the first model according to a brightness parameter of the first model, and adjust the brightness of the second model according to a brightness parameter of the second model may include: adjust the brightness of the first model according to the brightness parameter of the first model; and continue to adjust the brightness of the first model according to the brightness parameter of the first model and adjust the brightness of the second model according to the brightness parameter of the second model when the brightness of the first model reaches a second preset threshold.

In this embodiment, the display of the first model and the second model is adjusted by reasonably adjusting the brightness, to resolve a problem of overlapping between the first model and the second model in a switching process, so as to resolve a problem that switching is not smooth and natural and achieve an objective of smoothly and naturally completing switching of perspective modes.

Figure 11:
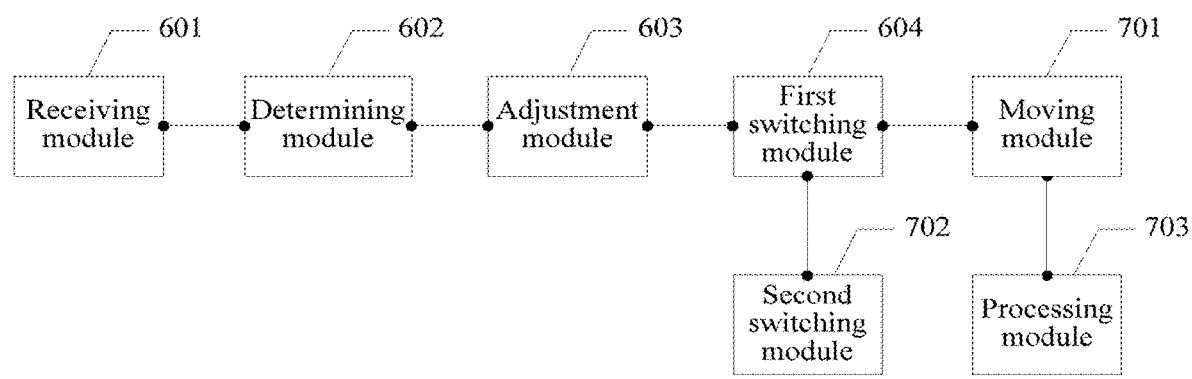
FIG. 11 is a schematic diagram of another embodiment of a terminal according to an embodiment of this application.

Further, referring to FIG. 11, in an optional embodiment of the embodiments of this application, a terminal in this embodiment of this application further includes:

a moving unit 701, configured to move a lens position according to a preset lens moving rule when the display of the first model and the second model is adjusted.

The moving unit is configured to move a lens from a first position corresponding to the first model to a second position corresponding to the second model.

In this embodiment, a switching process can be made to be more smooth and natural with the help of an operation of forward pushing or backward pulling on the camera lens in a process of switching perspective modes.

In an optional embodiment of the embodiments of this application, the terminal in this embodiment of this application may further include:

a second switching unit 702, configured to: switch a motion picture corresponding to the first model to a motion picture corresponding to the second model according to a preset motion switching rule when the display of the first model and the second model is adjusted.

In this embodiment, visual reasonableness in a switching process is ensured by using the motion picture corresponding to the first model and the motion picture corresponding to the second model. For example, in an actual application, the terminal can ensure visual reasonableness in a switching process by using actions of putting down and taking up of a ranged weapon and a melee weapon.

In an optional embodiment of the embodiments of this application, the terminal in this embodiment of this application may further include:

a processing module 703, configured to stop a moving operation on the lens if it is detected in a process of moving the lens that the lens collides.

In this embodiment, collision detection is added to the camera lens. If the camera lens collides in a moving process, the moving operation on the lens is immediately stopped, to ensure picture quality after switching.

Figure 12:
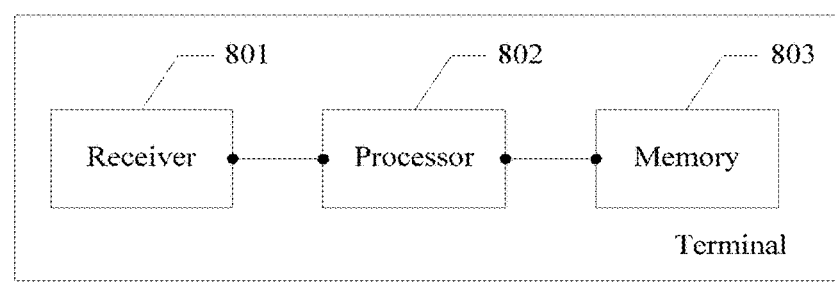
FIG. 12 is a schematic diagram of another embodiment of a terminal according to an embodiment of this application.

The terminal in this embodiment of this application is described above from the perspective of modularized functional entities. The terminal in this embodiment of this application is described below from the perspective of hardware processing. Referring to FIG. 12, the terminal in this embodiment of this application includes: a receiver 801, a processor 802, and a memory 803.

The terminal involved in this embodiment of this application may include more components or fewer components than those shown in FIG. 12, or two or more components may be combined, or a different component configuration or device may be used. The components may be implemented by using hardware including one or more signal processing and/or application specific integrated circuits, software, or a combination thereof.

The receiver 801 is configured to perform the following operations:

receiving a perspective switching instruction when a display mode is a first perspective model; and the processor 802 is configured to call an instruction stored in the memory 803 to perform the following operations:

determining a second perspective mode according to the perspective switching instruction;

adjusting a display parameter of a first model and a display parameter of a second model according to a preset model switching rule, the first model being a model displayed under the first perspective mode, and the second model being a model displayed under the second perspective mode; and adjusting display of the first model according to the adjusted display parameter of the first model, and adjusting display of the second model according to the display parameter of the second model, to switch the display mode to a second perspective mode.

The memory 803 is configured to store an instruction needed by the processor 802 to perform the corresponding operation.

In this embodiment, this embodiment of this application has the following advantages: in this embodiment of this application, the display parameters are reasonably adjusted, and the display of the first model and the second model is adjusted according to the adjusted display parameters, to switch the first perspective mode to the second perspective mode. As a result, a problem of overlapping between the first model and the second model in a perspective mode switching process, leading to that switching is not smooth and natural is resolved, to achieve an objective of smoothly and naturally completing switching of perspective modes.

Optionally, when the display parameter includes transparency, the processor 802 is configured to perform the following operation:

adjusting transparency of the first model and transparency of the second model according to the preset model switching rule.

Further, the processor 802 is configured to perform the following operation:

adjusting the transparency of the first model according to a transparency parameter of the first model, adjusting the transparency of the second model according to a transparency parameter of the second model, and adjusting the transparency parameter of the first model and the transparency parameter of the second model according to the preset model switching rule, the transparency parameter of the first model linearly changing with time, the transparency parameter of the second model linearly changing with time, and the transparency parameter of the first model being inversely correlated to the transparency parameter of the second model.

Further, the processor 802 is configured to perform the following operations:

adjusting the transparency of the first model according to the transparency parameter of the first model; and continuing to adjust the transparency of the first model according to the transparency parameter of the first model and adjust the transparency of the second model according to the transparency parameter of the second model when the transparency of the first model reaches a first preset threshold.

In this embodiment, the display of the first model and the second model is adjusted by reasonably adjusting the transparency, to resolve a problem of overlapping between the first model and the second model in a switching process, so as to resolve a problem that switching is not smooth and natural and achieve an objective of smoothly and naturally completing switching of perspective modes.

Optionally, when the display parameter includes brightness, the processor 802 is configured to perform the following operation:

adjusting brightness of the first model and brightness of the second model according to the preset model switching rule.

Further, the processor 802 is configured to perform the following operation:

adjusting the brightness of the first model according to a brightness parameter of the first model, and adjusting the brightness of the second model according to a brightness parameter of the second model, the brightness parameter of the first model linearly changing with time, the brightness parameter of the second model linearly changing with time, and the brightness parameter of the first model being inversely correlated to the brightness parameter of the second model. Further, the processor 802 is configured to perform the following operations:

adjusting the brightness of the first model according to the brightness parameter of the first model; and continuing to adjust the brightness of the first model according to the brightness parameter of the first model and adjust the brightness of the second model according to the brightness parameter of the second model when the brightness of the first model reaches a second preset threshold.

In this embodiment, the display of the first model and the second model is adjusted by reasonably adjusting the brightness, to resolve a problem of overlapping between the first model and the second model in a switching process, so as to resolve a problem that switching is not smooth and natural and achieve an objective of smoothly and naturally completing switching of perspective modes.

Optionally, the processor 802 is configured to perform the following operation:

moving a lens position according to a preset lens moving rule when the display of the first model and the second model is adjusted. Further, the processor 802 is configured to perform the following operation:

moving a lens from a first position corresponding to the first model to a second position corresponding to the second model.

Further, the processor 802 is configured to perform the following operation:

switching a motion picture corresponding to the first model to a motion picture corresponding to the second model according to a preset motion switching rule when the display of the first model and the second model is adjusted. In this embodiment, a switching process can be made to be more smooth and natural with the help of an operation of forward pushing or backward pulling on the camera lens in a process of switching perspective modes.

Secondly, visual reasonableness in a switching process is ensured by using the motion picture corresponding to the first model and the motion picture corresponding to the second model. For example, in an actual application, the terminal can ensure visual reasonableness in a switching process by using actions of putting down and taking up of a ranged weapon and a melee weapon.

Optionally, the processor 802 is further configured to perform the following operation:

stopping a moving operation on the lens if it is detected in a process of moving the lens that the lens collides.

In this embodiment, collision detection is added to the camera lens. If the camera lens collides in a moving process, the moving operation on the lens is immediately stopped, to ensure picture quality after switching.

An embodiment of this application further provides a storage medium, the storage medium being configured to store program code, the program code being used for performing the perspective mode switching method provided in the foregoing embodiments.

An embodiment of this application further provides a computer program product including an instruction, when run on a terminal, causing the terminal to perform the perspective mode switching method provided in the foregoing embodiments.

Figure 13:
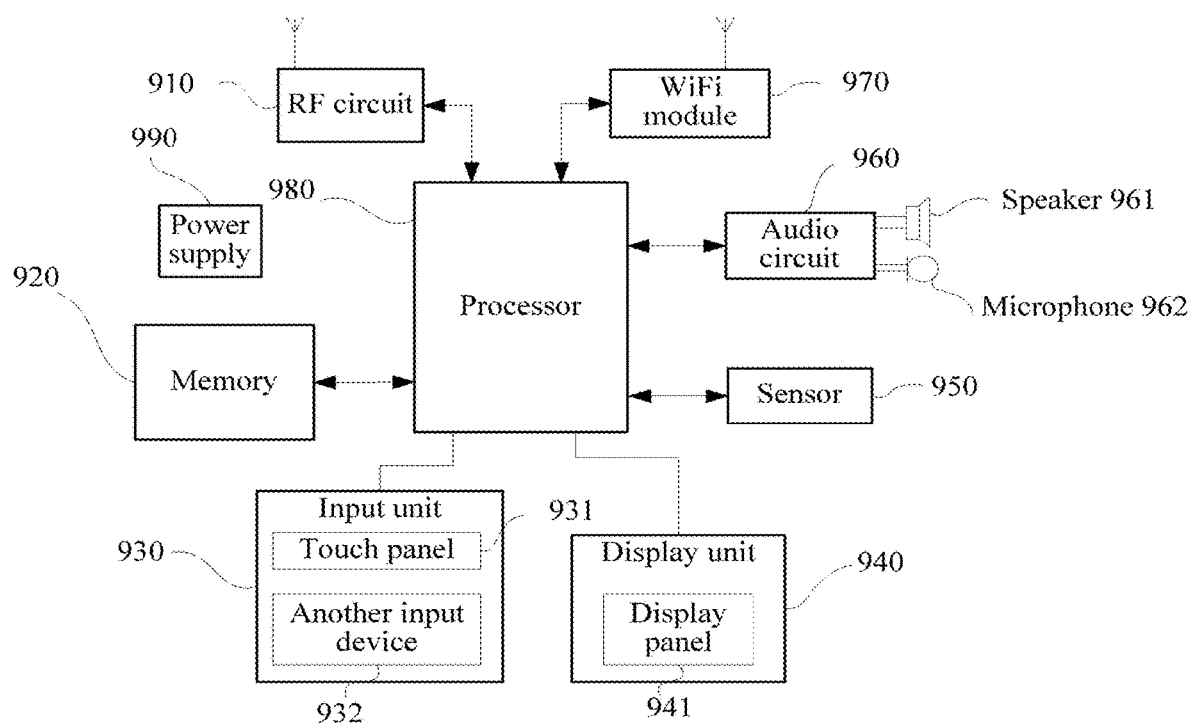
FIG. 13 is a schematic diagram of another embodiment of a terminal according to an embodiment of this application.

An embodiment of this application further provides a terminal. For ease of description, only a part related to this embodiment of this application is shown, and exemplary technical details are not disclosed. Refer to a method part in the embodiments of this application. The terminal may be any terminal device such as a mobile phone, a tablet computer, a PDA (Personal Digital Assistant, personal digital assistant), POS (Point of Sales, point of sales), an in-vehicle computer. That the terminal is a mobile phone is used as an example:

FIG. 13 is a block diagram of a structure of a part of a mobile phone related to a terminal according to an embodiment of this application. Referring to FIG. 13, the mobile phone includes: components such as a radio frequency (Radio Frequency, RF) circuit 910, a memory 920, an input unit 930, a display unit 940, a sensor 950, an audio circuit 960, a WiFi module 970, a processor 980, and a power supply 990. A person skilled in the art may understand that the structure of the mobile phone shown in FIG. 13 does not constitute a limitation to the mobile phone, and the mobile phone may include more components or fewer components than those shown in the figure, or some components may be combined, or a different component deployment may be used.

The following describes the components of the mobile phone with reference to FIG. 13.

The RF circuit 910 may be configured to receive and send a signal during an information receiving and sending process or a call process. For example, the RF circuit receives downlink information from a base station, then delivers the downlink information to the processor 980 for processing, and sends related uplink data to the base station. Generally, the RF circuit 910 includes, but is not limited to, an antenna, at least one amplifier, a transceiver, a coupler, a low noise amplifier (LNA), and a duplexer. In addition, the RF circuit 910 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 920 may be configured to store a software program and module. The processor 980 runs the software program and module stored in the memory 920, to implement various functional applications and data processing of the mobile phone. The memory 920 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 920 may include a high speed random access memory, and may further include a non-volatile memory, such as at least one magnetic disk storage device, a flash memory, or other volatile solid-state storage devices.

The input unit 930 may be configured to receive input digit or character information, and generate a keyboard signal input related to the user setting and function control of the mobile phone. For example, the input unit 930 may include a touch panel 931 and another input device 932. The touch panel 931 may also be referred to as a touchscreen, and may collect a touch operation of a user on or near the touch panel (such as an operation of a user on or near the touch panel 931 by using any suitable object or attachment, such as a finger or a stylus), and drive a corresponding connection apparatus according to a preset program. Optionally, the touch panel 931 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 980. Moreover, the touch controller can receive and execute a command sent by the processor 980. In addition, the touch panel 931 may be a resistive, capacitive, infrared, or surface sound wave type touch panel. In addition to the touch panel 931, the input unit 930 may further include the another input device 932. For example, the another input device 932 may include, but is not limited to: one or more of a physical keyboard, a functional key (such as a volume control key or a switch key), a track ball, a mouse, and a joystick.

The display unit 940 may be configured to display information input by the user or information provided for the user, and various menus of the mobile phone. The display unit 940 may include a display panel 941. Optionally, the display panel 941 may be configured by using a liquid crystal display (LCD), an organic light-emitting diode (OLED), or the like. Further, the touch panel 931 may cover the display panel 941. After detecting a touch operation on or near the touch panel 931, the touch panel 931 transfers the touch operation to the processor 980, so as to determine a type of a touch event. Then, the processor 980 provides corresponding visual output on the display panel 941 according to the type of the touch event. Although, in FIG. 13, the touch panel 931 and the display panel 941 are used as two separate parts to implement input and output functions of the mobile phone, in some embodiments, the touch panel 931 and the display panel 941 may be integrated to implement the input and output functions of the mobile phone.

The mobile phone may further include at least one sensor 950 such as an optical sensor, a motion sensor, and other sensors. For example, the optical sensor may include an ambient light sensor and a proximity sensor. The ambient light sensor may adjust luminance of the display panel 941 according to brightness of the ambient light. The proximity sensor may switch off the display panel 941 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 960, a speaker 961, and a microphone 962 may provide audio interfaces between the user and the mobile phone. The audio circuit 960 may convert received audio data into an electric signal and transmit the electric signal to the speaker 961. The speaker 961 converts the electric signal into a sound signal for output. On the other hand, the microphone 962 converts a collected sound signal into an electric signal. The audio circuit 960 receives the electric signal and converts the electric signal into audio data, and outputs the audio data to the processor 980 for processing. Then, the processor 980 sends the audio data to, for example, another mobile phone by using the RF circuit 910, or outputs the audio data to the memory 920 for further processing.

WiFi belongs to a short distance wireless transmission technology. The mobile phone may help, by using the wireless communications unit 970, the user to receive and send e-mails, browse a web page, access streaming media, and so on, which provides wireless broadband Internet access for the user. Although FIG. 13 shows the WiFi module 970, it may be understood that the WiFi module 970 is not a necessary component of the mobile phone, and when required, the WiFi module 970 may be omitted as long as the scope of the essence of the present disclosure is not changed.

The processor 980 is the control center of the mobile phone, and is connected to various parts of the mobile phone by using various interfaces and lines. By running or executing the software program and/or module stored in the memory 920, and invoking data stored in the memory 920, the processor 980 performs various functions and data processing of the mobile phone, thereby performing overall monitoring on the mobile phone. Optionally, the processor 980 may include one or more processing units. For example, the processor 980 may integrate an application processor and a modem processor. The application processor mainly processes an operating system, a user interface, an application program, and the like. The modem processor mainly processes wireless communication. It may be understood that the foregoing modem processor may alternatively not be integrated into the processor 980.

The mobile phone further includes the power supply 990 (such as a battery) for supplying power to the components. For example, the power supply may be logically connected to the processor 980 by using a power management system, thereby implementing functions such as charging, discharging and power consumption management by using the power management system.

Although not shown in the figure, the mobile phone may further include a camera, a Bluetooth module, and the like, which are not further described herein.

In this embodiment of this application, the processor 980 included in the terminal further has the following functions:
receiving a perspective switching instruction when a display mode is a first perspective mode; determining a second perspective mode according to the perspective switching instruction; adjusting a display parameter of a first model and a display parameter of a second model according to a preset model switching rule, the first model being a model displayed under the first perspective mode, and the second model being a model displayed under the second perspective mode; and adjusting display of the first model according to the display parameter of the first model, and adjusting display of the second model according to the display parameter of the second model, to switch the display mode to a second perspective mode.

It may be clearly understood by a person skilled in the art that, for the purpose of convenient and brief description, for a detailed working process of the foregoing system, apparatus, and unit, refer to a corresponding process in the foregoing method embodiments. Details are not described herein.

In the several embodiments provided in this application, it should be understood that the disclosed system, apparatus, and method may be implemented in other manners. For example, the described apparatus embodiments are merely exemplary. For example, the unit division is merely logical function division and may be other division during actual implementation. For example, a plurality of units or components may be combined or integrated into another system, or some features may be omitted or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located at one position, or may be distributed on a plurality of network units. Some of or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated units may be implemented in a form of hardware or may be implemented in a form of a software functional unit.

If implemented in the form of software functional units and sold or used as an independent product, the integrated units may be stored in a computer-readable storage medium. Based on such an understanding, the technical solutions of this application essentially, or the part contributing to the related technology, or all or a part of the technical solutions may be implemented in a form of a software product. The computer software product is stored in a storage medium and includes several instructions for instructing one or more computer devices (which may be a personal computer, a server, a network device, or the like) to perform all or some of steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The above embodiments are merely provided for describing the technical solutions of the embodiments of this application, but not intended to limit the technical solutions of the embodiments of this application. It should be understood by a person of ordinary skill in the art that although the embodiments of this application have been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the technical solutions of the embodiments of this application.

It is noted that the various modules, submodules, units, subunits, and components in the present disclosure can be implemented using any suitable technology. For example, a module or a unit can be implemented using processing circuitry. In an example, a module or a unit can be implemented using one or more integrated circuits (IC). In another example, a module or a unit can be implemented as one or more processors executing software instructions. In another example, interface circuitry is used to implement a receiving unit (or module) and/or a sending unit (or module).

What is claimed is:

1. A method for switching perspective, comprising:
  receiving, via interface circuitry of a terminal device, a perspective switching instruction when the terminal device is in a first perspective mode in which the terminal device displays a scenario from a first perspective;
  determining, by processing circuitry of the terminal device, a second perspective mode in which the terminal device displays the scenario from a second perspective in response to the perspective switching instruction;
  adjusting, by the processing circuitry, a first display parameter of a first model of the scenario from the first perspective and a second display parameter of a second model of the scenario from the second perspective according to a preset rule for a transition from the first perspective mode to the second perspective mode; and
  displaying, on a screen of the terminal device, the first model according to the first display parameter and the second model according to the second display parameter during the transition from the first perspective mode to the second perspective mode,
  wherein during the transition from the first perspective mode to the second perspective mode, the method further includes:
  adjusting a first transparency of the first model of the scenario from the first perspective and a second transparency of the second model of the scenario from the second perspective according to the preset rule, and
  adjusting a position of a virtual lens according to a preset lens moving rule.

2. The method according to claim 1, further comprising:
  during the transition from the first perspective mode to the second perspective mode,
  adjusting the first transparency to linearly change with time; and
  adjusting the second transparency to be inversely correlated with the first transparency.

3. The method according to claim 2, further comprising:
  during the transition from the first perspective mode to the second perspective mode,
  increasing the first transparency to a target level before reducing the second transparency;
  when the first transparency is increased to the target level, simultaneously increasing the first transparency and reducing the second transparency.

4. The method according to claim 1, further comprising:
stopping the position adjustment of the virtual lens when a collision of the virtual lens to an object in the scenario is detected.

5. The method according to claim 4, further comprising:
adjusting the position of the virtual lens from a first position corresponding to the first model of the scenario from the first perspective to a second position corresponding to the second model of the scenario from the second perspective.

6. The method according to claim 1, further comprising:
generating a plurality of pictures corresponding to a motion from the first perspective to the second perspective; and
displaying the plurality of pictures during the transition from the first perspective mode to the second perspective mode.

7. A terminal device, comprising:
interface circuitry configured to receive a perspective switching instruction when the terminal device is in a first perspective mode in which the terminal device displays a scenario from a first perspective; and
processing circuitry configured to:
determine a second perspective mode in which the terminal device displays the scenario from a second perspective in response to the perspective switching instruction;
adjust a first display parameter of a first model of the scenario from the first perspective and a second display parameter of a second model of the scenario from the second perspective according to a preset rule for a transition from the first perspective mode to the second perspective mode; and
display the first model according to the first display parameter and the second model according to the second display parameter during the transition from the first perspective mode to the second perspective mode,
wherein during the transition from the first perspective mode to the second perspective mode, the processing circuitry is further configured to:
adjust a first transparency of the first model of the scenario from the first perspective and a second transparency of the second model of the scenario from the second perspective according to the preset rule, and
adjust a position of a virtual lens according to a preset lens moving rule.

8. The terminal device according to claim 7, wherein the processing circuitry is further configured to:
during the transition from the first perspective mode to the second perspective mode,
adjust the first transparency to linearly change with time; and
adjust the second transparency to be inversely correlated with the first transparency.

9. The terminal device according to claim 8, wherein the processing circuitry is further configured to:
during the transition from the first perspective mode to the second perspective mode,
increase the first transparency to a target level before reducing the second transparency; and
when the first transparency is increased to the target level, simultaneously increase the first transparency and reducing the second transparency.

10. The terminal device according to claim 7, wherein the processing circuitry is further configured to:
during the transition from the first perspective mode to the second perspective mode,
adjust a first brightness of the first model of the scenario from the first perspective and a second brightness of the second model of the scenario from the second perspective according to another preset rule.

11. The terminal device according to claim 10, wherein the processing circuitry is further configured to:
during the transition from the first perspective mode to the second perspective mode,
adjust the first brightness to linearly change with time; and
adjust the second brightness to be inversely correlated with the first brightness.

12. The terminal device according to claim 11, wherein the processing circuitry is further configured to:
during the transition from the first perspective mode to the second perspective mode,
reduce the first brightness to a target level before increasing the second brightness; and
when the first brightness is reduced to a target value, simultaneously reduce the first brightness and increasing the second brightness.

13. The terminal device according to claim 7, wherein the processing circuitry is further configured to:
stop the position adjustment of the virtual lens when a collision of the virtual lens to an object in the scenario is detected.

14. The terminal device according to claim 13, wherein the processing circuitry is further configured to:
adjust the position of the virtual lens from a first position corresponding to the first model of the scenario from the first perspective to a second position corresponding to the second model of the scenario from the second perspective.

15. A non-transitory computer readable storage medium storing instructions which when executed by at least one processor in a terminal device cause the terminal device to perform:
receiving a perspective switching instruction when the terminal device is in a first perspective mode in which the terminal device displays a scenario from a first perspective;
determining a second perspective mode in which the terminal device displays the scenario from a second perspective in response to the perspective switching instruction;
adjusting a first display parameter of a first model of the scenario from the first perspective and a second display parameter of a second model of the scenario from the second perspective according to a preset rule for a transition from the first perspective mode to the second perspective mode; and
displaying, on a screen of the terminal device, the first model according to the first display parameter and the second model according to the second display parameter during the transition from the first perspective mode to the second perspective mode,
wherein during the transition from the first perspective mode to the second perspective mode, the instructions further cause the terminal device to perform:
adjusting a first transparency of the first model of the scenario from the first perspective and a second transparency of the second model of the scenario from the second perspective according to the preset rule, and
adjusting a position of a virtual lens according to a preset lens moving rule.

16. A method for switching perspective, comprising:

receiving, via interface circuitry of a terminal device, a perspective switching instruction when the terminal device is in a first perspective mode in which the terminal device displays a scenario from a first perspective;

determining, by processing circuitry of the terminal device, a second perspective mode in which the terminal device displays the scenario from a second perspective in response to the perspective switching instruction;

adjusting, by the processing circuitry, a first display parameter of a first model of the scenario from the first perspective and a second display parameter of a second model of the scenario from the second perspective according to a preset rule for a transition from the first perspective mode to the second perspective mode; and displaying, on a screen of the terminal device, the first model according to the first display parameter and the second model according to the second display parameter during the transition from the first perspective mode to the second perspective mode, wherein during the transition from the first perspective mode to the second perspective mode, the method further includes:

(i) adjusting a first transparency of the first model of the scenario from the first perspective and a second transparency of the second model of the scenario from the second perspective according to the preset rule, or (ii) adjusting a first brightness of the first model of the scenario from the first perspective and a second brightness of the second model of the scenario from the second perspective according to the preset rule, and adjusting a position of a virtual lens according to a preset lens moving rule.

* * * * *